United States Patent [19]
Cardas

[11] 3,845,780
[45] Nov. 5, 1974

[54] PRESSURE REGULATING MEANS FOR GAS STORAGE TANKS INCLUDED IN SEWERAGE SYSTEMS

[76] Inventor: Octavian Cardas, 1001 Pine St., San Francisco, Calif. 94109

[22] Filed: Apr. 25, 1974

[21] Appl. No.: 463,893

[52] U.S. Cl. ............................... 137/251, 137/578
[51] Int. Cl. ............................................ F16k 17/12
[58] Field of Search ........... 137/578, 251, 252, 253, 137/213, 505.19; 220/26 R

[56] References Cited
UNITED STATES PATENTS
1,437,138  11/1922  Gray .................................. 137/251
2,171,698  9/1939  Hetzer ........................... 137/251 X

*Primary Examiner*—Alan Cohan

[57] ABSTRACT

A gas pressure regulating means for gas storage tanks included in a sewerage system is disclosed. Gas formed in sludge digestion tanks is supplied to a floating dome, or roof, type gas storage tank provided with the pressure regulating means of this invention An axially movable vent tube is carried by the floating dome with the inner end of the tube extending vertically downwardly within the dome and terminating therewithin at an adjustable distance from the bottom thereof. A vent tube actuator for axially adjusting the position of the tube end within the dome is provided outside the dome where the tube extends through the dome. Power means such as an electrical motor may be used to operate the actuator from a remote location.

9 Claims, 4 Drawing Figures

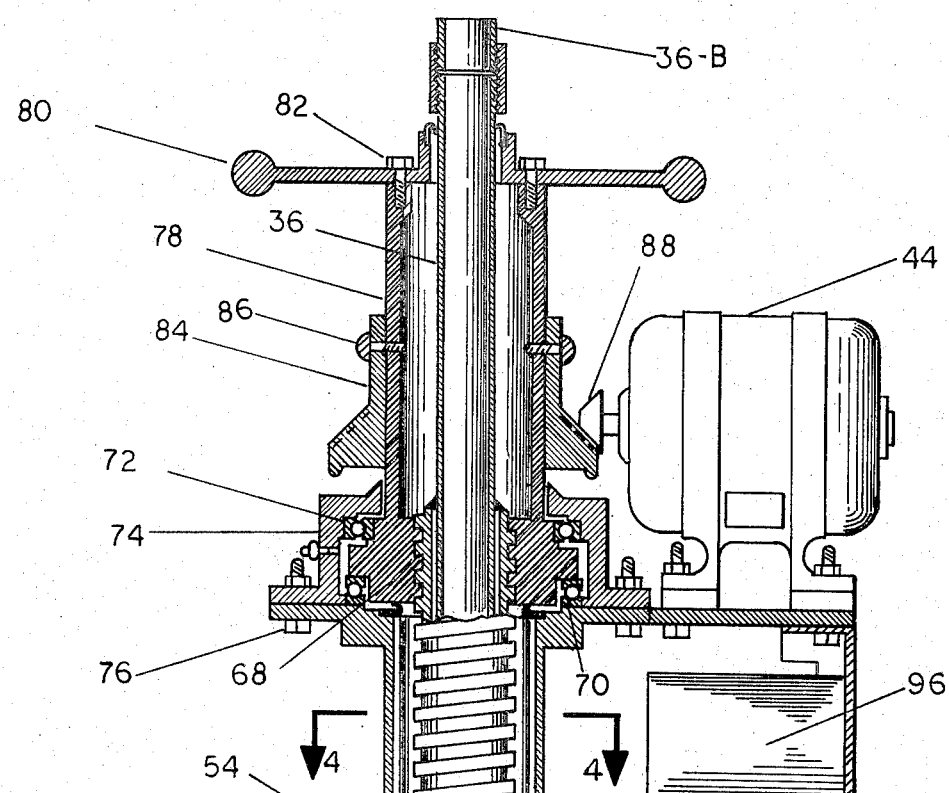
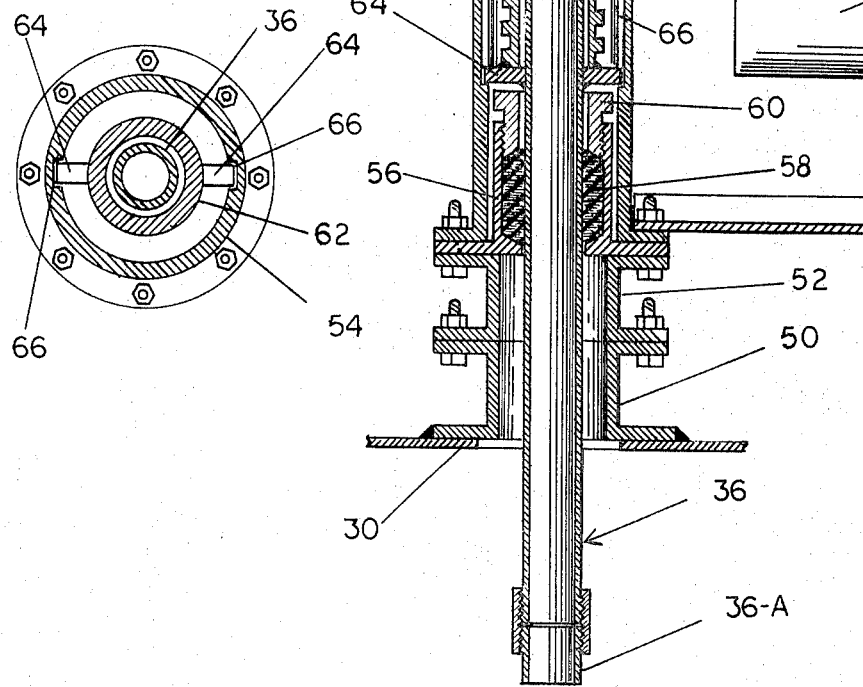
FIG. 3
FIG. 4

PRESSURE REGULATING MEANS FOR GAS STORAGE TANKS INCLUDED IN SEWERAGE SYSTEMS

BACKGROUND OF THE INVENTION

Sewage treatment plants include, inter alia, tanks for sludge digestion. Gases produced during the digestion process must be vented from the digestion tanks, and it is common practice to utilize such gas for such purposes as heating, power generation, and the like. The gas from the digestion tanks is supplied to one or more storage tanks for storage until utilized. In practice either closed pressure tanks, or floating dome type tanks are employed. My invention is directed to a floating dome type tank with adjustable pressure regulating means for preventing excessive pressure buildup therein.

SUMMARY OF THE INVENTION AND OBJECTS

An object of this invention is the provision of adjustable pressure relief means for use with floating dome type gas storage tanks used in the storage of gases produced during sewage digestion.

An object of this invention is the provision of adjustable pressure relief means of the above described type which is readily adjustable from a remote operating location whereby the pressure setting is easily adjusted to compensate for differences in storage tank construction, ambient operating conditions, and the like.

The above and other objects and advantages are achieved by an arrangement which includes a generally vertically extending vent pipe or tube attached to the dome of a floating dome type gas storage tank, which dome floats within a liquid-filled tank. As gas is introduced into the tank the dome rises in response to increased gas pressure therewithin. In the unfilled tank condition the lower end of the vent tube extends into the liquid thereby sealing the tube off from the stored gas to prevent venting thereof. As the tank is filled with gas the floating dome rises, and at some point in the upward travel thereof the lower end of the vent tube emerges from the liquid. In this raised dome condition stored gas is vented from the dome preventing excessive pressure build-up therein and escape of gas through the seal provided by the liquid in the tank. The vent pipe or tube is vertically movable under control of a pipe operator for setting the pressure level at which venting takes place. Motor operation of the pipe operator is contemplated.

BRIEF DESCRIPTION OF THE DRAWING

FIG. 3 is an enlarged fragmentary elevational view of the pressure regulating means, with parts shown broken away for clarity, and FIG. 4 is a cross sectional view taken along line 4—4 of FIG. 3.

Figure 1:
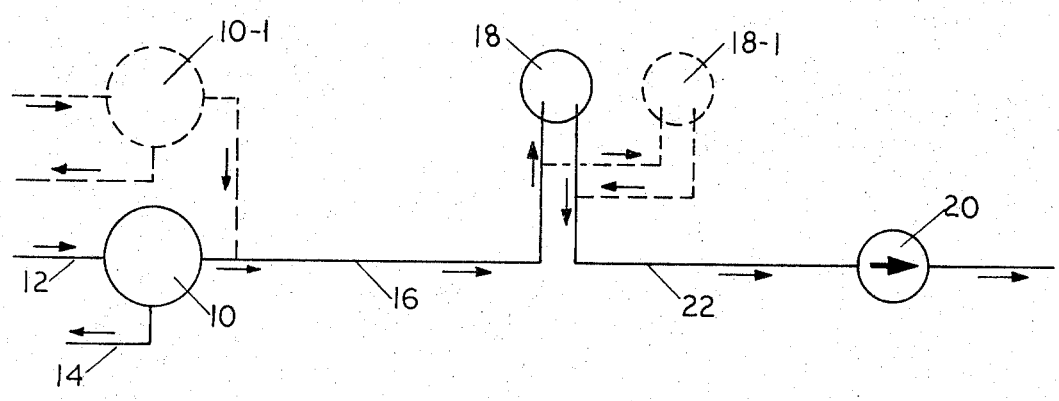
FIG. 1 is a schematic diagram of a portion of a sewage treatment plant and showing gas storage tanks for the storage of gas produced during sewage treatment.

A typical municipal sewerage system includes screens or racks for the removal of floating matter, sedimentation tanks for the removal and collection of sludge and digestion tanks to which the sludge is conveyed for digestion thereof. During the digestion process gases are produced which may be conveyed to gas storage tanks for subsequent use. The gas may be used for such purposes as heating the sewage treatment plant buildings, heating the digestion tanks to optimum temperature for good digestion, generating steam and electrical power used in the treatment plant and the like. In the schematic diagram of FIG. 1 sludge is supplied to a digestion tank 10 through line 12 and, after thorough digestion, is discharged through line 14. Suitable valves, not shown, control the flow of the sludge into and out of the digestion tank.

The gas generated during the digestion process is carried over line 16 to a storage tank 18 of the floating dome type. The digestion gases are generated at a very low pressure, on the order of 0.2 lbs/in$^2$ (or 6 inch head of water). If the pressure in the digestion tank exceeds this level the digestion process, and gas generation, decreases and is subsequently stopped if the pressure is allowed to rise to too great a level. A fan-type pump 20 in the discharge line 22 from the gas storage tank 18 is used to increase the gas pressure to a suitable level for subsequent utilization by any desired means, not shown. A typical sewerage system may include a plurality of digestion and gas storage tanks, such as indicated in broken lines and identified by reference characters 10-1 and 18-1, respectively. With a plurality of gas storage tanks, as shown, gas pressure regulating means at only one of the tanks may be required to provide the necessary pressure relief function, as described below.

Figure 2:
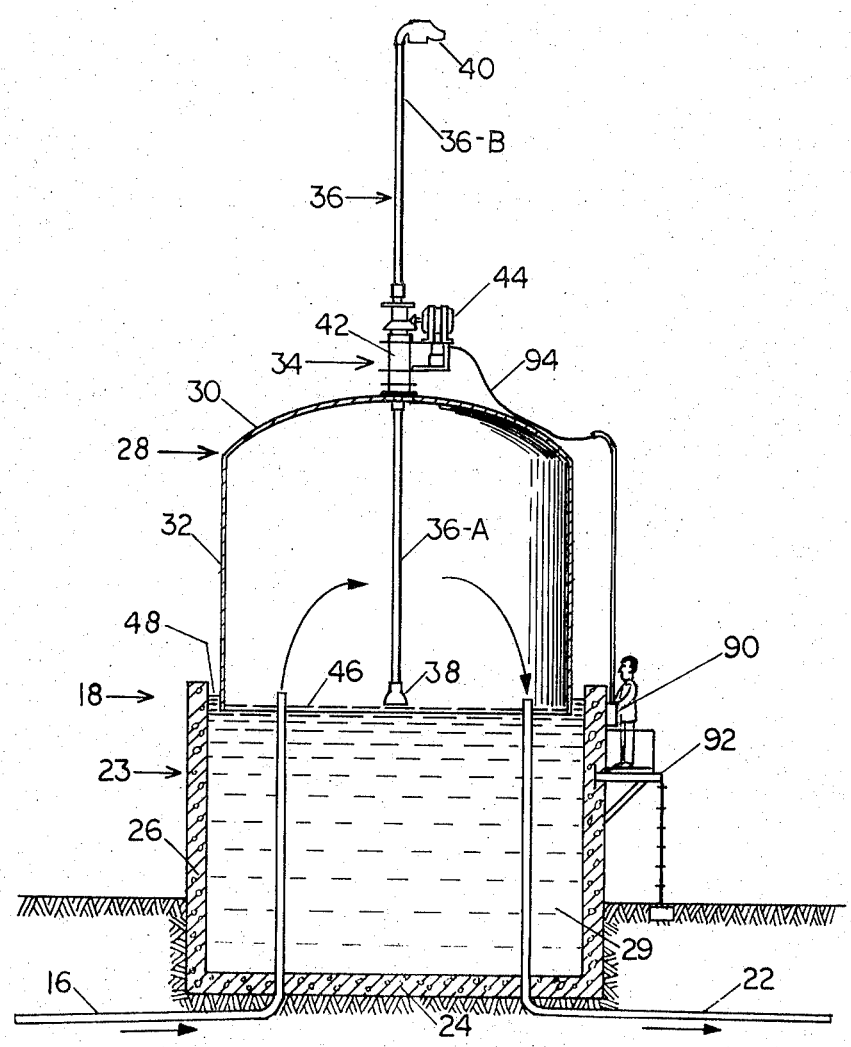
FIG. 2 is a vertical sectional view of a floating dome type storage tank which is provided with the novel pressure regulating means of my invention.

Reference is made to FIG. 2 wherein a vertical sectional view through a gas storage tank 18 is shown together with the novel gas pressure regulating means of this invention. The tank 18 includes a fixed base tank portion or container 23 having a circular base 24, and an upwardly extending cylindrical side wall 26 which is closed at the top by the floating dome or roof 28. The container 23 is filled with a liquid 29, such as water, with the gas inlet and outlet pipes 16 and 22 extending upwardly therethrough and terminating above the water level.

The illustrated dome 28 has a generally inverted cup shaped top 30 and a cylindrical shaped side wall 32 which telescopically fits into the base tank 23. The pressure regulating device 34 of this invention is attached to the dome 28 adjacent the center of the top 30. It includes a vent pipe 36 having a lower end portion 36A which terminates in a bell-shaped housing 38 adjacent the lower end of the dome, and an upper end portion 36B which terminates in a flame arrester 40. As described in greater detail hereinbelow the vent pipe 36 is axially movable by means of a pipe actuator 42 which may be operated by an electrical motor 44 for lowering and raising the same. With the dome in a lowered condition, the lower end of the vent 36 is submerged in the water 29 to prevent the escape of gas therethrough. With the admission of gas to the tank through the inlet pipe 16 at a faster rate than the discharge thereof through the outlet 22 the gas pressure within the dome increases thereby raising the dome. The vent pipe 36 is vertically adjusted by means of the operator 42 to a level such that the inlet thereto emerges from the water 29 for venting of excess gas therethrough when a pressure of approximately 6" head of water is reached. In FIG. 2 the water levels inside and outside the dome are identified by the reference characters 46 and 48, respectively.

The upper end of the vent pipe 36 extends well above the top of the tank for dissipation of the vented gases into the atmosphere. In this manner the danger of explosion at the tank and pollution of the air imediately surrounding the same are minimized.

Details of the pipe operator to vertically adjust the same for venting at the desired gas storage pressure are shown in FIG. 3 to which FIG. reference now is made. A flanged coupling 50 is secured as by welding to the top 30 of the dome 28 at the aperture through which the pipe 36 extends. A second flanged coupling 52 is bolted to the top of the coupling 50 and, in turn, an elongated tubular actuator housing 54 is bolted thereto. The flange portion of flanged packing housing 56 is clamped between the coupling 52 and housing 54, which packing housing includes a cylindrical section extending coaxially inside the housing 54. An annular seal or packing 58 is secured in place within the housing 56 by a packing nut 60. The annular seal 58 embraces the outer surface of the pipe 36 while permitting axial sliding of the pipe therein. Gas within the tank is prevented from passing upwardly along the outside of the pipe 36 by the sealing means.

A tubular threaded member 62 is secured, as by welding, to the pipe 36, and a pair of radially extending pins 64 is welded to the pipe 36 and/or threaded member 62. The pins 64 extend into axial grooves 66 formed inside the actuator housing 54 to prevent rotation of the pipe and threaded member 62 while permitting axial motion thereof within the housing. (See also FIG. 4.) A rotatable drive member 68 threadedly engages the externally threaded member 62 for axial drive thereof upon rotation of the member 68. The threaded drive member 68 is rotatably mounted by means of bearings 70 and 72 which are held in operative position therewith by a flanged bearing retaining housing 74 attached by bolts 76 to the upper end of the actuator housing 54.

The drive nut, or member, 68 is formed with an upwardly extending sleeve 78 to which a hand wheel 80 is attached by bolts 82 for hand rotation thereof, and to which a bevel gear 84 is attached by pins 86 for power rotation by the motor 44 through cooperating bevel gear 88. It will be apparent that as the drive nut 68 is rotated by either the handwheel 80 or motor 44, the threaded sleeve 62 and attached pipe 36 is axially driven up or down depending upon the direction of rotation of the drive nut.

In the arrangement shown in FIG. 2, operation of the motor 44 is controlled from a reversible switching unit 90 attached to th side of the tank adjacent a platform 92. An electrical cable 94 connects the motor 44 to the switches 90 for forward or reverse operation of the motor under control of a human operator standing on the platform. To adjust the novel venting means for operation of the storage tank at a desired pressure the vent tube may be lowered into the liquid 29 by an operator standing on the platform 92 who observes when gas begins to bubble up through the water seal about the edge of the floating dome. At this point in operation it will be apparent that maximum gas pressure has been reached since an increase in the pressure merely produces an increase in the bubbling action. The vent pipe 36 then is raised by operation of the motor, under control of the operator, to a point at which bubbling through the water seal ceases. Operation at a lower pressure is possible, of course, by simply raising the vent pipe further for venting at some lower point in the dome level. Adjustment for different operating conditions also is possible. For example, if a layer of snow is deposited on the dome roof thereby adding to the weight thereof, the vent pipe may be raised to compensate therefor. The bell-shaped, enlarged diameter opening 38 at the lower end of the pipe 36 allows for the smooth flow of gas into the pipe when the pipe end is only slightly raised above the water level.

Limit switches 96 for limiting vertical travel of the pipe by operation of the motor, and a torque limit switch 98 for limiting motor torque may be included in the motor circuit.

The invention having been described in detail in accordance with the requirements of the Patent Statutes, various changes and modifications will suggest themselves to those skilled in this art, which changes and modifications shall fall within the spirit and scope of the invention as defined in the appended claims.

I claim:

1. A gas pressure regulator for use with a gas storage tank of the type which includes a dome formed with a roof floating in a liquid filled container at a level dependent upon the pressure of gas therewithin, said pressure regulator including.

a vent pipe extending through the roof of the dome and having a downwardly extending lower portion inside the dome and an upwardly extending upper portion outside the dome, means forming a gas outlet at the upper pipe portion, means forming a gas inlet at the lower portion of the vent pipe submerged in the liquid of the liquid-filled container in a lowered dome position and open to the dome gas in a raised dome position, and power operated actuating means for raising and lowering the gas inlet means at the lower portion of the vent pipe to control the dome height above which venting is effected.

2. A gas pressure regulator as defined in claim 1 wherein said gas inlet means includes a bell-shaped housing at the lower end of said vent pipe through which gas may enter the vent pipe.

3. A gas pressure regulator as defined in claim 1 wherein said gas inlet means includes an opening at the lower portion of the vent pipe through which gas may enter the pipe when the opening is above the level of liquid in the container, said power operated actuating means including means for axially raising and lowering said vent pipe for raising and lowering said opening.

4. A gas pressure regulator as defined in claim 3 wherein said gas inlet means includes a bell-shaped housing with an enlarged diameter lower end through which gas may enter the vent pipe.

5. A gas pressure regulator as defined in claim 1 including a reversible electrical motor for power operation of said actuating means.

6. A gas pressure regulator as defined in claim 1 wherein said actuating means includes, externally threaded means on said pipe, means for preventing rotation of said pipe while allowing for axial movement thereof, a driving member in threaded engagement with said externally threaded means, means for preventing axial movement of said driving member while allowing for rotation thereof, and means for rotating said driving member for axially driving said pipe.

7. A gas pressure regulator as defined in claim 6 wherein said means for rotating said driving member includes a handwheel.

8. A gas pressure regulator as defined in claim 6 wherein said means for rotating said driving member includes an electrical motor.

9. A gas pressure regulator as defined in claim 8 including a manually operated motor control circuit adjacent the upper edge of the liquid-filled container for manual control thereof.

* * * * *